F. D. BOOTH & J. C. BELDIN.
WIRE JOINT SOLDERING TORCH.
APPLICATION FILED MAR. 21, 1910.
966,990.
Patented Aug. 9, 1910.
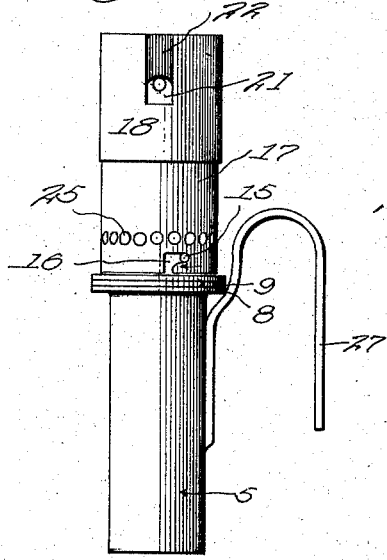
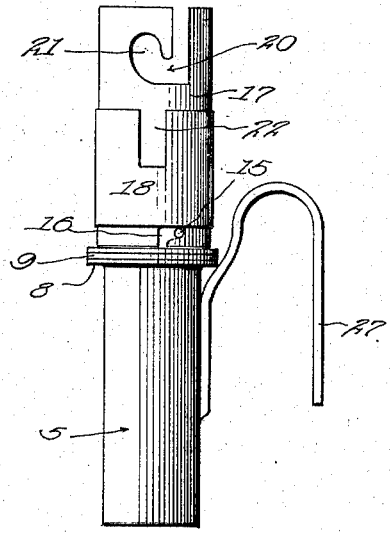
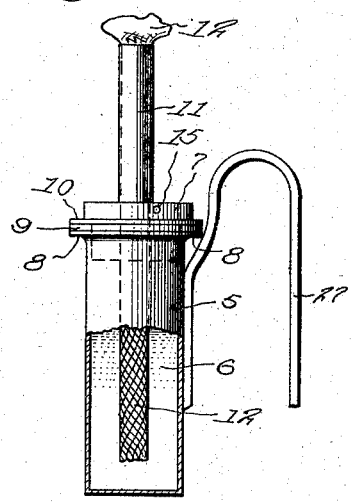
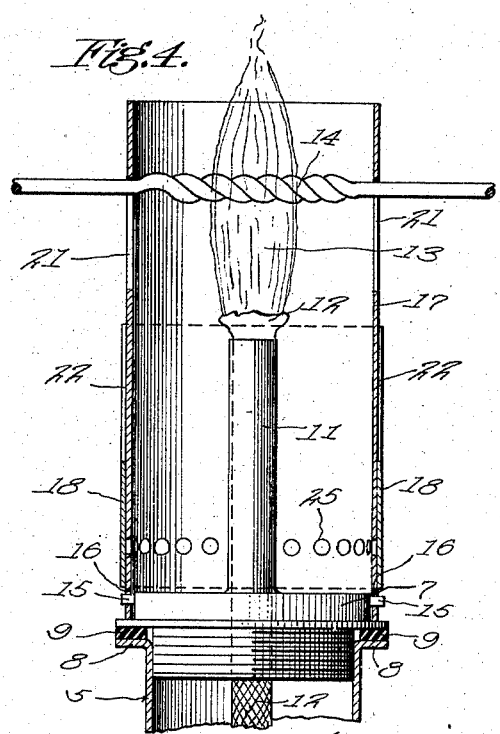

UNITED STATES PATENT OFFICE.

FRANK D. BOOTH AND JOSEPH C. BELDIN, OF GLENDALE, CALIFORNIA.

WIRE-JOINT-SOLDERING TORCH.

966,990.  Specification of Letters Patent.  Patented Aug. 9, 1910.

Application filed March 21, 1910. Serial No. 550,791.

*To all whom it may concern:*

Be it known that we, FRANK D. BOOTH and JOSEPH C. BELDIN, both citizens of the United States, residing in and near the city of Glendale, respectively, in the county of Los Angeles and State of California, have invented new and useful Improvements in Wire-Joint-Soldering Torches, of which the following is a specification.

This invention relates to a torch adapted particularly for the use of linemen in soldering wire joints, although the torch is not restricted to that peculiar use but is adapted for many uses as will hereinafter become apparent.

There are at present in use two forms of torches for the work described. One form is the plain alcohol wick torch and the other is the familiar form of gasolene blow torch. Either of these forms are liable to be extinguished by a high wind and are therefore untrustworthy. In addition, the gasolene torch is difficult to generate while the lineman is at work on a pole, as he must descend to the ground, generate the torch and carry it up the pole with him while it is burning. This operation is inconvenient and dangerous and also involves the expenditure of a large amount of time if it is done each time a joint is soldered. If it is not done and the torch is allowed to burn during the intervals between actual use a large amount of fuel is wasted.

It is the prime object of the present invention to supply a device which will overcome the above named difficulties in a simple and efficient manner. A torch utilizing alcohol or other suitable fuel is used and provision made for the protection of the flame from any wind. The same device which accomplishes this also concentrates the heat of the flame on the desired portion of the wire and affords a means of supporting the whole device from the wire itself and obviating the necessity of supporting the torch by the hand. Provision is also made for keeping the base of the torch at a comparatively low temperature so that the fuel reservoir shall not become heated to an undesired degree.

In the accompanying drawings Figure 1 is a side elevation of our torch in position for use in a high wind. Fig. 2 is a similar view with the outer shield lowered for ordinary use. Fig. 3 is a partly sectional view of the torch with the shields removed. Fig. 4 is an enlarged section showing the application of the torch to a wire and showing the internal construction of the same.

In the drawings 5 designates the body or base of the torch which is made in the form of a reservoir to hold fuel 6, preferably alcohol. Cap 7 of the base is in screw threaded engagement with the base, a flange 8 being formed on the upper edge of the base for engagement with a washer 9. A flange 10 on the cap 7 bears upon the upper face of the washer, thus forming a liquid tight joint with the base and preventing the escape of the fuel under the most adverse conditions.

A tube 11 extends upwardly from cap 7 and contains a wick 12 through which alcohol 6 is passed to the upper end of the tube by capillary attraction. Flame 13 burns from the upper end of the tube, being of such shape and size as to most efficiently heat a wire joint 14.

Mounted on cap 7 are two pins 15 with which apertures 16 in the lower end of inner tubular shield 17 are adapted to engage. Apertures 16 are of such configuration that shield 17 may be secured upon cap 7 by turning in the direction indicated by the arrow. By turning in the opposite direction the cap may be easily and immediately removed.

Slidably mounted on inner shield 17 is an outer shield 18, this shield being adapted to slide up and down the inner shield between the two positions shown. Shield 17 is provided with two apertures 20 of the configuration illustrated, a portion 21 of the aperture extending upwardly and sidewardly from the lower end of the main portion thereof, the aperture as a whole extending from the upper edge of the shield downwardly toward the center of the shield. Shield 18 is provided with two apertures 22 of simple rectangular construction.

In using our improved torch, the wire joint is placed in the position shown, the wires passing through portions 21 of aperture 20. When the wires pass through those portions it will be seen that the whole torch can be hung upon the wires and that the flame will then play directly upon the joint within the shield. For ordinary use shield 18 may be placed in the position shown in Fig. 2, while for use in a high wind shield 18 is placed as is shown in Fig. 1. When placed in this position it uncovers a series of draft openings 25 around the lower edge of shield 17. These draft openings provide sufficient ventilation for the flame when the larger part of the openings through apertures 20 is cut off, and they also provide means for keeping the lower part of the shield and the reservoir base at a comparatively low temperature. The height of the flame above the base also has a large bearing upon the amount of heat communicated to the case, this distance being made quite large in order to keep the base as cool as possible.

From the foregoing it will be seen that we have provided a torch which may be utilized in an extremely simple and efficient manner. It is easily carried by the lineman in ascending a pole, hook 27 being provided for insertion in his belt. This hook also serves the purpose of a handle for holding the torch when necessary. This torch is easily lighted without the necessity of generation such as is the case with a gasolene torch. On this account it can be lighted and extinguished just as is desired for heating purposes, both time and fuel being thus saved to a large extent.

Having described our invention, we claim:—

1. A torch, comprising a base, a burner mounted on the base, and a tubular shield mounted on the base around the burner, the shield having apertures therein extending from its edge to points adjacent and above the burner, the portions of the apertures adjacent the burner extending horizontally.

2. A torch, comprising a base, a burner mounted in the base, and a tubular shield mounted in the base around the burner, the shield having hook shaped apertures leading from its edge to points adjacent the burner.

3. A torch, comprising a reservoir base, a burner mounted on the base, an inner tubular shield detachably mounted on the base and provided with apertures therein, the apertures extending from the upper edge of the shield and being hooked shaped, and an outer tubular shield movably mounted on the inner shield and having apertures extending from its upper edge toward the center.

4. A torch, comprising a reservoir base, a burner mounted on the base at its upper end, the burner comprising a tube extending upwardly from the base and having a wick in its interior extending down into the reservoir interior of the base, and a tubular shield detachably mounted on the base and extending upwardly therefrom around the burner for the protection of the flame, the shield having a series of draft openings at its base near the top of the reservoir base and having apertures in its walls extending from the upper edge downwardly, these last named apertures having upwardly and sidewardly extending extensions at their lower ends.

5. A torch, comprising a reservoir base, a burner mounted on the base at its upper end, the burner comprising a tube extending upwardly from the base and having a wick in its interior extending down into the reservoir of the base, an inner tubular shield detachably mounted on the base and extending upwardly therefrom around the burner for the protection of the burner, the shield having a series of draft openings at its base near the top of the reservoir base and having apertures in its walls extending from its upper edge downwardly, these last named apertures having upwardly and sidewardly extending extensions at their lower ends, and an outer tubular shield mounted on the inner shield and movable thereon, the outer shield having apertures extending downwardly from its upper edge.

6. A torch, comprising a base, a burner mounted in the base, a tubular shield mounted on the base around the burner and having apertures therein extending from the edge of the shield to points adjacent and above the burner, the portions of the apertures adjacent the burner extending horizontally, and an outer tubular shield movably mounted on the inner shield and having apertures therein leading from its edges to its center portion.

In witness that we claim the foregoing we have hereunto subscribed our names this 14th day of March 1910.

FRANK D. BOOTH.
JOSEPH C. BELDIN.

Witnesses:
 JAMES T. BARKELEW,
 ELWOOD H. BARKELEW.